US011651206B2

United States Patent
Fan et al.

(10) Patent No.: US 11,651,206 B2
(45) Date of Patent: May 16, 2023

(54) MULTISCALE FEATURE REPRESENTATIONS FOR OBJECT RECOGNITION AND DETECTION

(71) Applicant: International Business Machines Corporation, Armonk, NY (US)

(72) Inventors: Quanfu Fan, Somerville, MA (US); Richard Chen, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 16/020,339

(22) Filed: Jun. 27, 2018

(65) Prior Publication Data

US 2020/0005122 A1  Jan. 2, 2020

(51) Int. Cl.
  *G06N 3/08* (2023.01)
  *G06N 3/04* (2023.01)
  (Continued)

(52) U.S. Cl.
  CPC ............ *G06N 3/08* (2013.01); *G06F 7/14* (2013.01); *G06F 18/217* (2023.01);
  (Continued)

(58) Field of Classification Search
  CPC ...... G06N 3/0454; G06N 20/00; G06N 20/20; G06N 3/08; G06N 3/04; G06N 3/063; G06N 3/045; G06F 7/14; G06K 9/6256; G06K 9/4628; G06K 9/6262; G06K 9/6267; G06K 9/6292; G06K 9/6857; G06K 9/00744; G06K 9/00751; G06K 9/4604;
  (Continued)

(56) References Cited

U.S. PATENT DOCUMENTS 9,400,919 B2  7/2016  Yin et al.
9,530,071 B2  12/2016  Yin et al.
(Continued)

FOREIGN PATENT DOCUMENTS

CN  105975931 A  9/2016
CN  105981051 A  9/2016
(Continued)

OTHER PUBLICATIONS

Krizhevsky et al. ImageNet Classification with Deep Convolutional Neural Networks (2012) (Year: 2012).*
(Continued)

*Primary Examiner* — Viker A Lamardo
*Assistant Examiner* — Leonard A Sieger
(74) *Attorney, Agent, or Firm* — Cantor Colburn LLP; Stosch Sabo

(57) ABSTRACT

Embodiments of the present invention are directed to a computer-implemented method for multiscale representation of input data. A non-limiting example of the computer-implemented method includes a processor receiving an original input. The processor downsamples the original input into a downscaled input. The processor runs a first convolutional neural network ("CNN") on the downscaled input. The processor runs a second CNN on the original input, where the second CNN has fewer layers than the first CNN. The processor merges the output of the first CNN with the output of the second CNN and provides a result following the merging of the outputs.

19 Claims, 13 Drawing Sheets

(51) Int. Cl.

| | |
|---|---|
| *G06N 20/20* | (2019.01) |
| *G06N 3/045* | (2023.01) |
| *G06V 10/764* | (2022.01) |
| *G06V 10/82* | (2022.01) |
| *G06F 7/14* | (2006.01) |
| *G06V 30/24* | (2022.01) |
| *G06V 10/80* | (2022.01) |
| *G06F 18/21* | (2023.01) |
| *G06F 18/25* | (2023.01) |
| *G06V 10/44* | (2022.01) |
| *G06V 20/00* | (2022.01) |

(52) U.S. Cl.
CPC ............ *G06F 18/254* (2023.01); *G06N 3/04* (2013.01); *G06N 3/045* (2023.01); *G06N 20/20* (2019.01); *G06V 10/454* (2022.01); *G06V 10/764* (2022.01); *G06V 10/809* (2022.01); *G06V 10/82* (2022.01); *G06V 20/00* (2022.01); *G06V 30/2504* (2022.01)

(58) Field of Classification Search
CPC ............ G06K 9/00536; G06K 9/4609; G06K 9/00221; G06K 9/00624; G06K 9/00288; G06K 9/00671; G06K 9/0061; G06K 9/627; G06K 9/00617
See application file for complete search history.

(56) References Cited

U.S. PATENT DOCUMENTS

| | | | |
|---|---|---|---|
| 2015/0363634 A1 | 12/2015 | Yin et al. | |
| 2016/0104053 A1* | 4/2016 | Yin ..................... | G06T 7/11 382/156 |
| 2016/0148079 A1* | 5/2016 | Shen .................. | G06V 10/7747 382/157 |
| 2017/0169315 A1 | 6/2017 | Vaca Castano et al. | |
| 2017/0330586 A1* | 11/2017 | Roblek ............... | G06F 11/0715 |
| 2018/0032846 A1 | 2/2018 | Yang et al. | |
| 2018/0060740 A1 | 3/2018 | Bradley et al. | |
| 2019/0205700 A1* | 7/2019 | Gueguen ............ | G06V 10/82 |
| 2020/0342955 A1* | 10/2020 | Guo .................... | G16H 50/30 |

FOREIGN PATENT DOCUMENTS

| | | |
|---|---|---|
| CN | 107341517 A | 11/2017 |
| CN | 107506763 A | 12/2017 |
| WO | 2018052586 A1 | 3/2018 |

OTHER PUBLICATIONS

Ghodrati et al., DeepProposals: Hunting Objects and Actions by Cascading Deep Convolutional Layers (Mar. 15, 2017) (Year: 2017).*

Li et al. A Convolutional Neural Network Cascade for Face Detection (2015) (Year: 2015).*

Chen et al. Semantic Image segmentation with Deep Convolutional Nets and Fully Connected CRFs (Jun. 7, 2016) (Year: 2016).*

Krizhevsky et al. ImageNet Classification with Deep Convolutional Neural Networks (2012) (AlexNet) (Year: 2012).*

Takahashi et al., "A Novel Weight-Shared Multi-Stage Network Architecture of CNNs for Scale Invariance", 2017, arXiv, v1702.03505v2, pp. 1-8 (Year: 2017).*

Lee et al., "Multi-Level and Multi-Scale Feature Aggregation Using Pretrained Convolutional Neural Networks for Music Auto-Tagging", 2017, IEEE Signal Processing Letters, vol. 24, No. 8, pp. 1208-1212 (Year: 2017).*

Zhao et al., "ICNet for Real-Time Semantic Segmentation on High-Resolution Images", 2017, arXiv, v1704.08545v1, pp. 1-9 (Year: 2017).*

Li et al., "Multiscale convolutional neural network for the detection of built-up areas in high-resolution SAR images", 2016, IEEE International Geoscience and Remote Sensing Symposium (IGARSS), vol. 2016, pp. 910-913 (Year: 2016).*

Alhichri et al., "Multi-scale Convolutional Neural Network for Remote Sensing Scene Classification", May 5, 2018, 2018 IEEE International Conference on Electro/Information Technology (EIT), vol. 2018, pp. 113-117 (Year: 2018).*

Hu et al., "A Multiscale Fusion Convolutional Neural Network for Plant Leaf Recognition," Jun. 2018, IEEE Signal Processing Letters, vol. 25, No. 6, pp. 853-857 (Year: 2018).*

Li et al., "A convolutional neural network cascade for face detection", 2015, 2015 IEEE Conference on Computer Vision and Pattern Recognition (CVPR), vol. 2015, pp. 5325-5334 (Year: 2015).*

Bell et al.; "Inside-Outside Net: Detecting Objects in Context with Skip Pooling and Recurrent Neural Networks" CVPR Paper 2017; 10 pages.

Cai et al.; "A Unified Multi-scale Deep Convolutional Neural Network for Fast Object Detection"; ECCV Paper 2016; 16 pages.

Eigen et al.; "Predicting Depth, Surface Normals and Semantic Labels with a Common Multi-Scale Convolutional Architecture"; Dept. of Computer Science, Courant Institute, New York University; Dec. 17, 2015; 9 pages.

Garcia-Garcia et al.; "A Review on Deep Learning Techniques Applied to Semantic Segmentation"; Applied Computational Intelligence and Soft Computing; Apr. 22, 2017; 23 pages.

Huang et al.; "Speed/accuracy trade-offs for modern convolutional object detectors"; CVPR Paper 2017; 10 pages.

Lin et al.; "Feature Pyramid Networks for Object Detection"; Facebook AI Research, Cornell University and Cornell Tech; CVPR Paper 2017; 9 pages.

Mel et al.; "The NIST Definition of Cloud Computing—Recommendations of the National Institute of Standards and Technology"; National Institute of Standards and Technology, US Department of Commerce; Sep. 2011; 7 pages.

Nah et al.; "Deep Multi-scale Convolutional Neural Network for Dynamic Scene Deblurring"; CVPR Paper 2017; 9 pages.

Pinheiro et al.; "Learning to Refine Object Segments"; Facebook AI Research, European Conference on Computer Vision; Jul. 26, 2016; 18 pages.

Qian et al.; "Multi-scale Deep Learning Architectures for Person Re-identification"; ICCV Paper 2017; 10 pages.

Yan et al.; "Multiscale Convolutional Neural Networks for Hand Detection"; Applied Computational Intelligence and Soft Computing, vol. 2017, Article ID 9830641; 14 pages.

International Search Report; International Application No. CN 201910561512.8; International Filing Date: Jun. 26, 2019; dated Dec. 5, 2022; 9 pages.

* cited by examiner

| Network | Top-1 Error | FLOPs ($10^9$) | Params ($10^6$) |
|---|---|---|---|
| ResNet-101 | 21.95% | 7.80 | 44.54 |
| bL-ResNet-101 | 22.90% | 3.75 (2.07×) | 47.87 |
| bL-ResNet-101† | 22.67% | 4.06 (1.92×) | 43.29 |
| bL-ResNet-101@288† | 21.50% | 6.70 (1.16×) | 43.29 |
| ResNet-152 | 21.51% | 11.51 | 60.19 |
| bL-ResNet-152 | 22.58% | 4.91 (2.34×) | 64.59 |
| bL-ResNet-152† | 22.27% | 5.09 (2.26×) | 58.34 |
| bL-ResNet-152@288† | 21.01% | 8.42 (1.37×) | 58.34 |

†: the bL-ResNet with new block distribution.

FIG 9

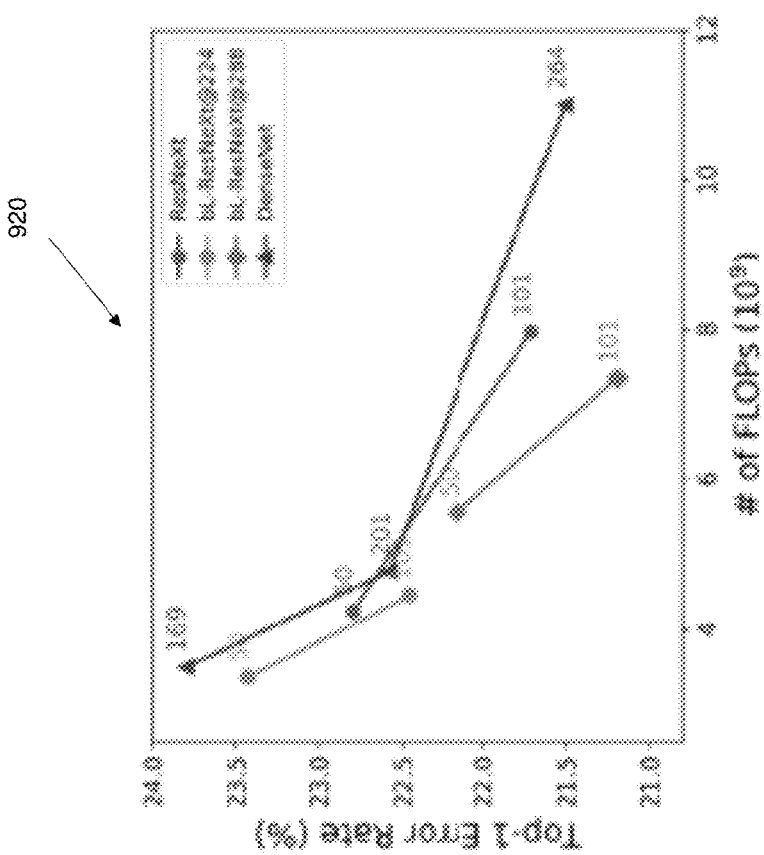
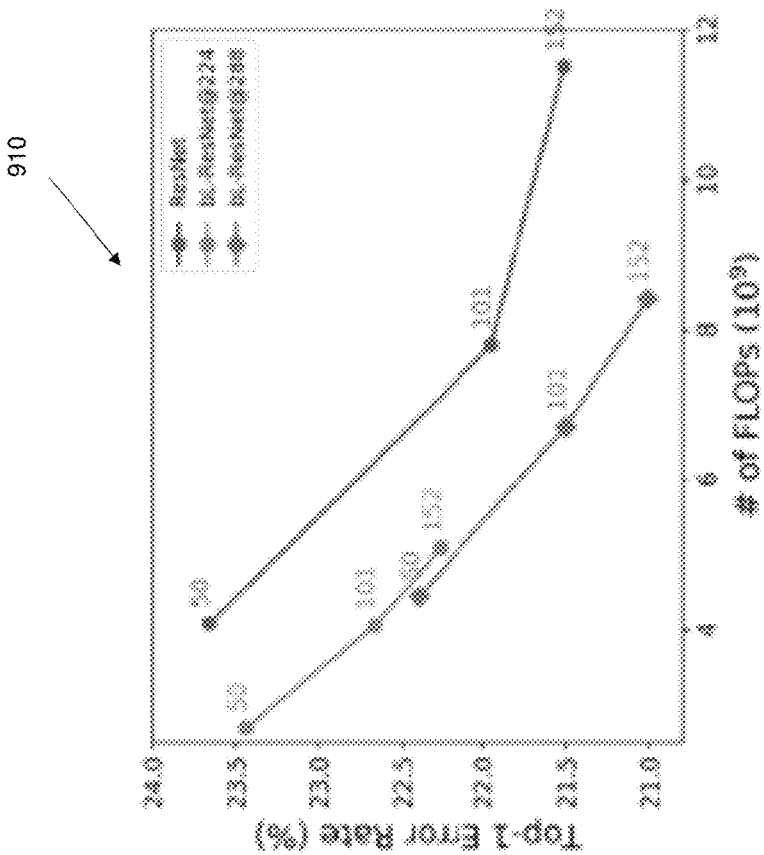
FIG 10

FIG 11

| Network | Speed (ms) | Car | | | Cyclist | | | Pedestrian | | |
|---|---|---|---|---|---|---|---|---|---|---|
| | | Easy | Mod. | Hard | Easy | Mod. | Hard | Easy | Mod. | Hard |
| VGG-16 | 198 | 0.94 | 0.83 | 0.72 | 0.91 | 0.83 | 0.80 | 0.83 | 0.74 | 0.68 |
| bL-VGG-16-I | 137 | 0.90 | 0.77 | 0.65 | 0.83 | 0.75 | 0.72 | 0.77 | 0.69 | 0.63 |
| bL-VGG-16-II | 195 | 0.98 | 0.87 | 0.74 | 0.93 | 0.84 | 0.81 | 0.87 | 0.77 | 0.70 |

Mod.: Moderate

FIG 12

MULTISCALE FEATURE REPRESENTATIONS FOR OBJECT RECOGNITION AND DETECTION

BACKGROUND

The present invention generally relates to signal processing, and more specifically, to systems and approaches for multiscale feature representations for object recognition and detection.

Image representation is a fundamental issue for object detection and recognition in computer vision. In many cases, multiscale representations are desirable in challenging scenarios because of their capabilities of covering more object scales. A naïve way to create a multiscale representation is to compute image features multiple times at different scales. However, this is prohibitively costly in computation and thus not very useful in practice. Some recent convolutional neural network ("CNN") based approaches combine features from intermediate to deep convolutional layers to form a richer feature representation. This strategy is proven effective and also efficient because only one forward computation is needed for extracting features. However, the intermediate-level features are known to be less discriminative than the features at deeper layers.

SUMMARY

Embodiments of the present invention are directed to a computer-implemented method for multiscale representation of input data for object recognition and detection. A non-limiting example of the computer-implemented method includes a processor receiving an original input. The processor downsamples the original input into a downscaled input. The processor runs a first convolutional neural network on the downscaled input. The processor runs a second CNN on the original input, where the second CNN has fewer layers than the first CNN. The processor merges the output of the first CNN with the output of the second CNN and provides a result following the merging of the outputs.

Embodiments of the present invention are directed to a system for multiscale representations of input data for object recognition and detection. A non-limiting example of the system includes a memory and a processor coupled to the memory, the processor operable to execute instructions stored in the memory. The instructions cause the processor to receive an original input and downsample the original input into a downscaled input. The instructions further cause the processor to run a first convolutional neural network on the downscaled input and run a second CNN on the original input, where the second CNN has fewer layers than the first CNN. The instructions case the processor to merge the output of the first CNN with the output of the second CNN and provide a result following the merging of the outputs.

Embodiments of the invention are directed to a computer program product for multiscale representations of image data for object recognition and detection. The computer program product comprising a computer readable storage medium having program instructions embodied therewith. The program instructions are executable by a processor to cause the processor to perform a method. A non-limiting example of the method includes a processor receiving an original input. The processor downsamples the original input into a downscaled input. The processor runs a first convolutional neural network on the downscaled input. The processor runs a second CNN on the original input, where the second CNN has fewer layers than the first CNN. The processor merges the output of the first CNN with the output of the second CNN and provides a result following the merging of the outputs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 depicts a table of exemplary results comparing operation of a bL-Net to a baseline ResNet according to embodiments of the invention.

FIG. 10 depicts two graphs of exemplary results comparing operation of a bL-Net to a baseline ResNet and a baseline ResNeXt according to embodiments of the invention.

FIG. 11 depicts a table of exemplary results comparing operation of a bL-Net to a baseline VGG-16 network according to embodiments of the invention.

FIG. 12 depicts two graphs of exemplary results comparing operation of a bL-Net to a baseline VGG-16 network according to embodiments of the invention.

Figure 1:
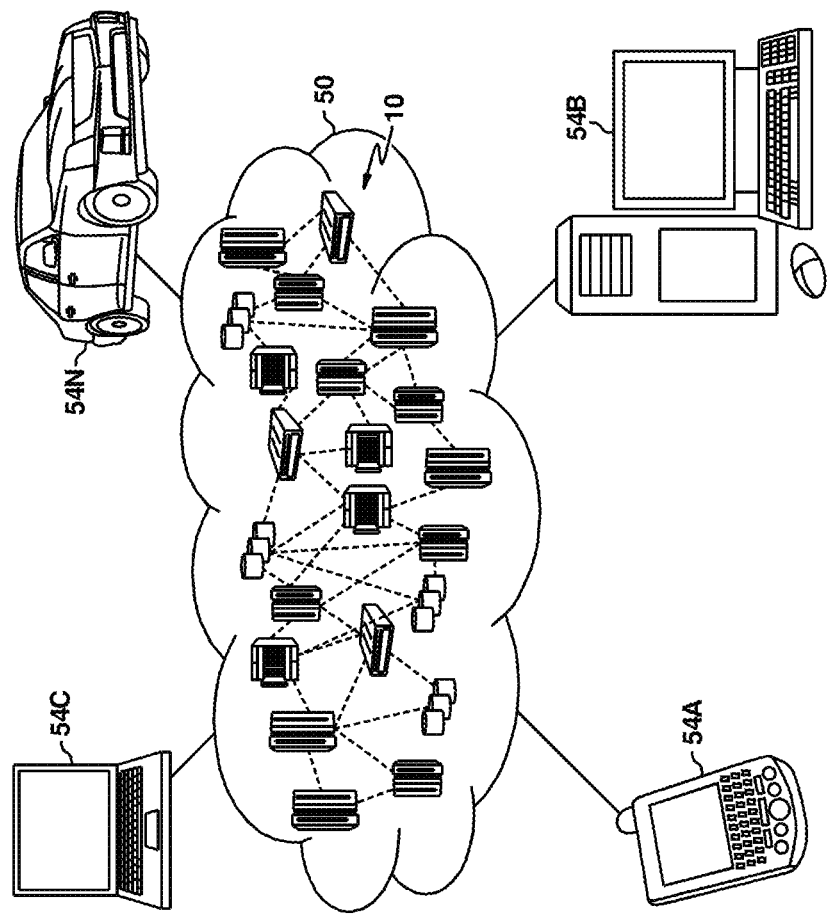
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
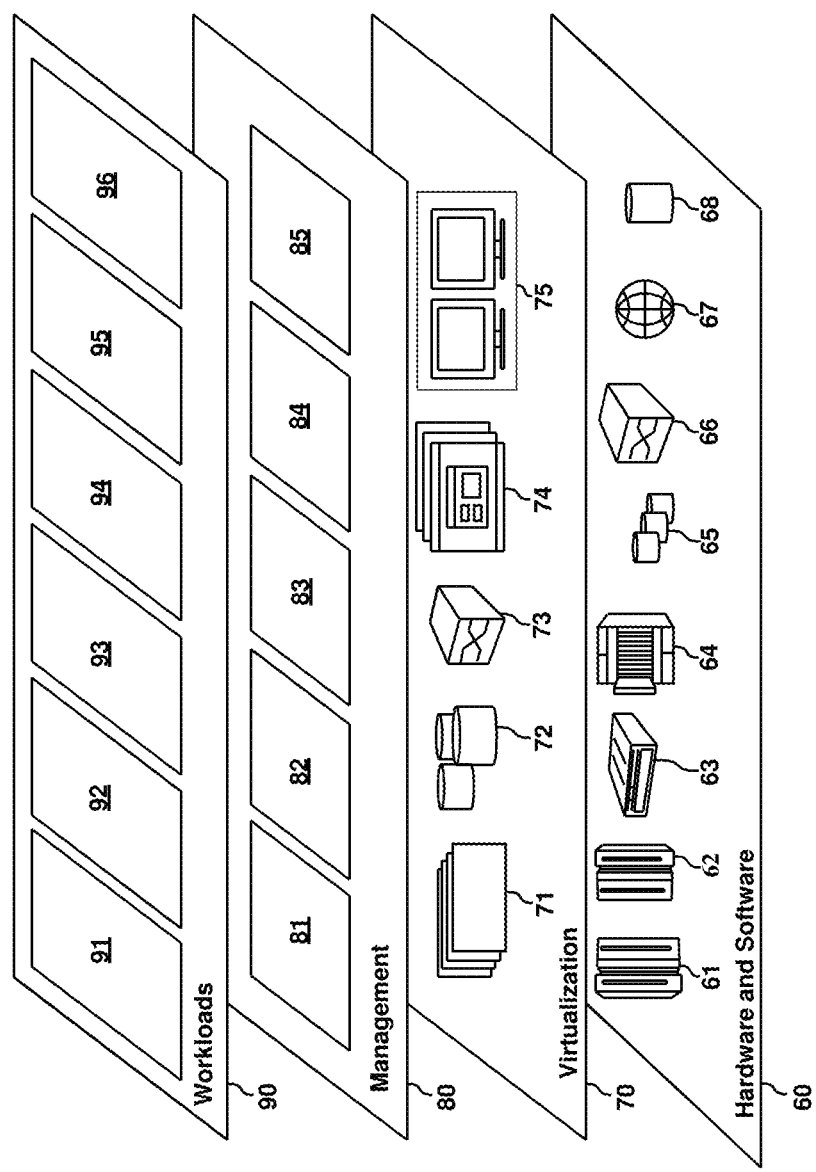
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-scale representations of image data for object recognition and detection 96.

Turning now to an overview of technologies that are more specifically relevant to aspects of the invention, the notion of multi-scale image representations can be dated back to image pyramids and scale-space theory. Such representations offer a number of advantages over fixed-scale methods and have proven to be helpful for many vision tasks. for example, edge detection, object classification and detection, image segmentation, visual tracking, super-resolution, person re-identification and deblurring.

As deep learning becomes more and more prevalent in computer vision, there have been significant effort and progress on integrating multiple-scale representations into deep neural networks, especially into CNNs. Roughly speaking, these approaches can be grouped into two categories regardless of the problems addressed. The first category focuses on combining features from different layers of a single CNN. Because CNNs inherently capture both low-level and high-level visual information at different layers, it's natural to merge the responses of these layers to form a stronger feature representation. Nevertheless, doing so does not introduce many computational overheads. However, the low-level and high-level information are not of the same type, thus combining them directly in a naive way is usually less effective. The second category attempts to couple multiple CNNs trained at different image scales to acquire more competitive feature representations. One drawback of this solution is that the combination of multiple networks often leads to a substantial increase in computational cost as well as model size.

Turning now to an overview of the aspects of the invention, one or more embodiments of the invention address the above-described shortcomings of the prior art by providing a computer-implemented method and system to learn multiscale feature representations automatically without significant overhead. The computer-implemented method consists of multiple CNNs, each of which represents an image at one scale. One of them acts as the backbone model which is responsible for providing a good feature representation. The others are auxiliary and designed to be lightweight. The features from the backbone model are downsampled or upsampled and further fed into the auxiliary models at different scales via shortcuts. This allows an auxiliary model to focus on learning to compensate the approximated features for enhancement rather than learning to acquire a feature representation alone. The former is an easier task than the latter, thus can be achieved by smaller networks.

In this disclosure, examples are described that demonstrate how such an idea can improve object detection or speed up an existing CNN network using multiscale feature representations. Exemplary embodiments of the multiscale CNNs ("MSCNNs") described herein provide for networks of different computational loads to provide balance between efficiency and accuracy. They also provide for efficient, frequent merging of information. The exemplary embodiments of MSCNNs described herein also improve existing CNN technology, while not significantly increasing model size. The disclosed, exemplary MSCNNs are configurable for efficiency, i.e. reduced model size, or for accuracy.

Figure 3:
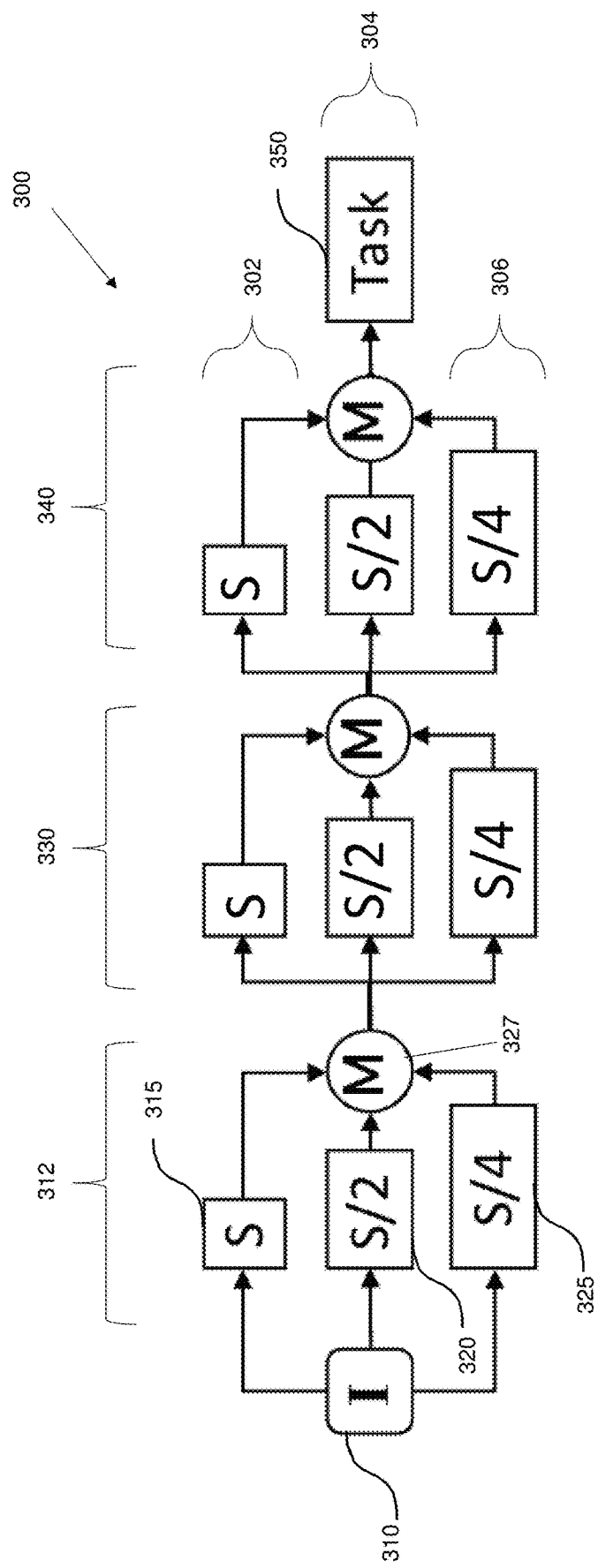
FIG. 3 depicts an exemplary embodiment of an MSCNN or bL-Net according to embodiments of the invention.

Turning now to a more detailed description of aspects of the present invention, FIG. 3 depicts an exemplary embodiment of an MSCNN according to embodiments of the invention. MSCNN 300 includes CNN 302, CNN 304, and CNN 306. Those skilled in the art after reading this disclosure would appreciate that two CNNs could be use or greater than three CNN's could be used. Each CNN 302, 304, 306 includes three convolutional stages 312, 330, and 340. Greater or fewer convolutional stages can be used. The length of each block in FIG. 3 is a representation of the number of operations and model size of each block, i.e., longer blocks have more operations and a greater model size. This will become clearer as discussion continues into the processing of an image, I 310. Although this description will be in the context of images, other signals, such as audio, could also be processed with the exemplary MSCNNs described herein.

An image, I 310, is received by MSCNN 300. The first CNN 302 operates on Image I 310 in its original resolution of size S at convolution 315. The second CNN 304 operates on Image I 310 in half of its original resolution, S/2, at convolution 320. The third CNN 306 operates on Image I 310 in one-quarter of its original resolution, S/4, at convolution 325. Note that the lowest resolution image has the more complex model and greater number of calculations than the middle resolution convolution 320, which has a more complex model and greater number of calculations than the original resolution convolution 315. CNN 306 acts as the primary CNN, with CNN 302 and CNN 304 being auxiliary CNNs.

The outputs of the first convolution stage 312 are merged together at merge 327. In addition, the original image I 310 can be fed forward from I 310 to the merge 327 and added to the merged information. There are two types of merges possible. The first type of merging, referred to as pairwise merging herein, joins features from multiple networks by linear addition. The other one is referred to a groupwise merging herein concatenates the features of multiple networks, and if needed, subsequently applies a 1×1 convolution to fuse the features. In an exemplary embodiment of MSCNN 300 pairwise merging is used.

The above network is repeated in the next two stages 330 and 340 of the CNNs, until the result is output at Task 304, where, for example, an image, such as a car, may be identified by the MSCNN 300. The output of each merge 327 along the MSCNN may also be fed forward to the next merge.

To achieve an efficient exemplary MSCNN, network architecture is designed with the following principles. First, each exemplary CNN corresponds to a single scale. Second, the complexity of an exemplary CNN is inversely proportional to its scale. And third, exemplary CNN's exchange information by pairwise merging. The second principle implies that high-complexity networks are placed on low-resolution inputs and low-complexity networks are placed on high-resolution inputs. Furthermore, merging multiple branches at different scales can regularize the MSCNN to learn robust features, because each CNN not only learns features at its own scale but also learns the differences between scales.

This reaps tremendous technical advantages over prior CNNs. A CNN model, if running at half of the original image size, can gain a remarkable computational savings of 75%. Motivated by this, the disclosure integrates networks with different structures and complexity to balance between speed and accuracy. The fundamental principle applied in the design is high-complexity networks (accurate but costly) on low resolution and low complexity networks (efficient but less accurate) on high resolution. Specifically, one network is designated as the backbone, or primary, responsible for learning a primary feature representation. This network is deep but works on low resolution for efficiency. While the feature representation learned from low resolution is less satisfying, it gets enriched by local image details provided by the other less costly networks that run at higher resolution. In other words, the two types of networks are designed to be supplemental to each other. The backbone network is referred to as Big-Net and the others as Little-Nets to reflect their differences in terms of structural complexity. Accordingly the new network architecture is called Big-Little Net or bL-Net for short. MSCNN 300 described above is one example of a bL-Net.

By using this approach, a greater than two times computational speedup is provided, while providing comparable results to several baseline CNNs, such as ResNet and ResNeXt. In addition, at the same number of FLOPS state-of-the art networks are surpassed in terms of accuracy.

Figure 4:
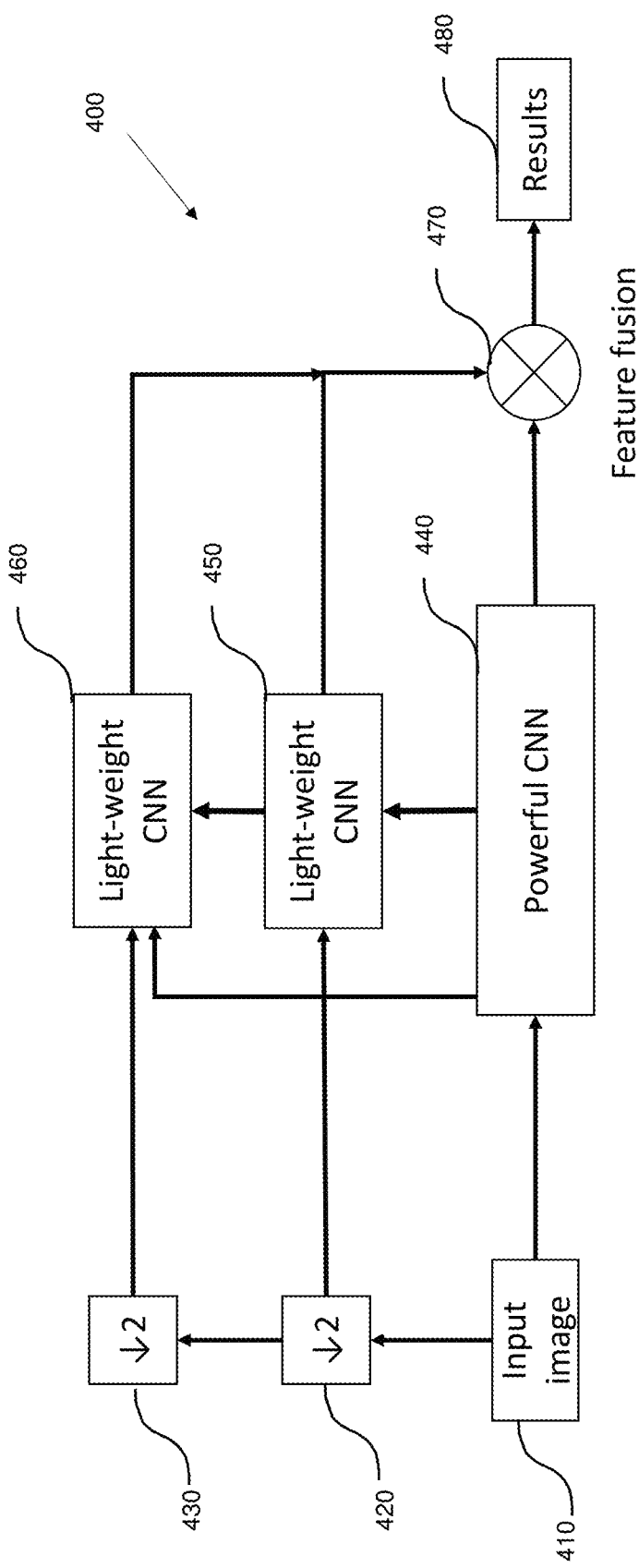
FIG. 4 depicts an exemplary CNN designed for performance enhancement according to embodiments of the invention.

FIG. 4 depicts an exemplary MSCNN 400 designed for performance enhancement according to embodiments of the invention. This exemplary MSCNN 400 inverts the principle of high-complexity on low-resolution and low-complexity on high-resolution in order to maximize performance of the exemplary MSCNN 400. An input image 410 is downscaled by a factor of two for a one-half scale representation 420, and then it is downscaled again by a factor of two for a one-quarter scale representation 430.

The original size input image 410 is received by an exemplary powerful CNN 440. The one-half scale image 420 is received by exemplary light-weight CNN 450, which also receives the output of exemplary powerful CNN 440. The one-quarter scale image 430 is received by exemplary light-weight CNN 460, which also receives the output of exemplary powerful CNN 440 and exemplary light-weight CNN 450. The output of each of the exemplary CNNs 440, 450, 460 is merged at 470 which outputs results 480. The results can be, for example, identification of an object in the input image 410.

Figure 5:
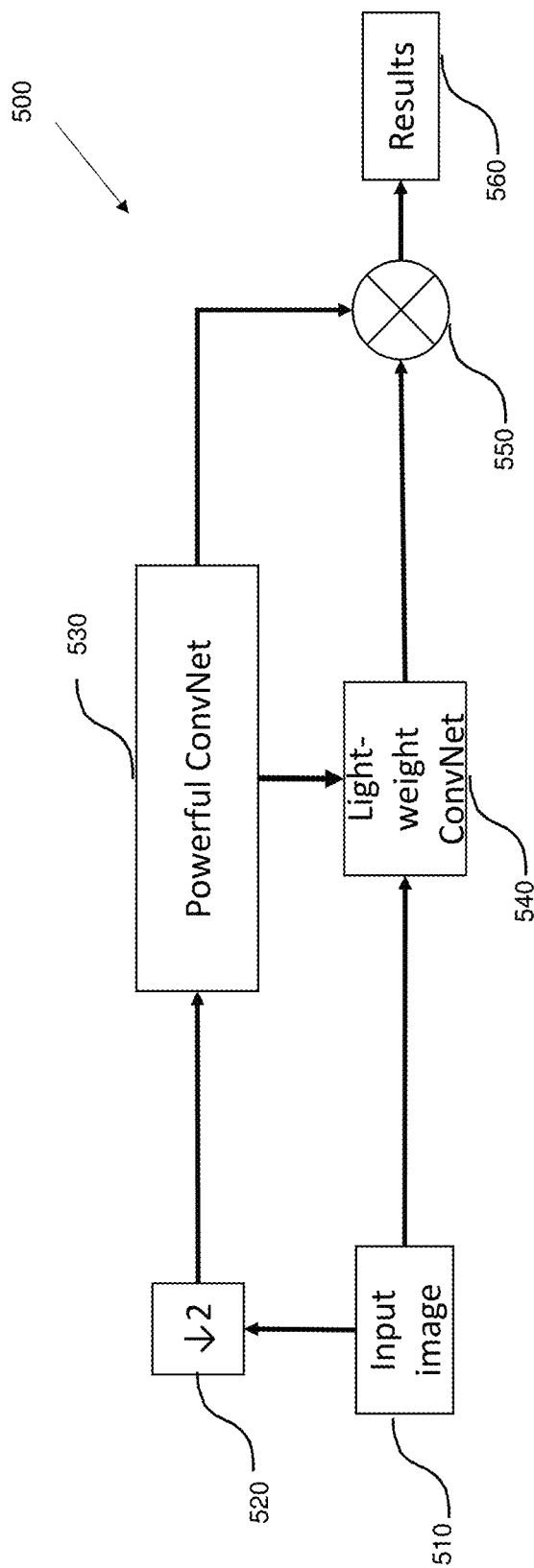
FIG. 5 depicts an exemplary bL-Net 500 according to embodiments of the invention.

FIG. 5 depicts an exemplary bL-Net 500 according to embodiments of the invention. bL-Net 500 is an exemplary MSCNN according to an embodiment of the invention. In keeping with the principles outlined earlier, an input image 510 is scaled down by a factor of two to a half-scale image 520. An exemplary powerful CNN 530 receives the downscaled image 520. An exemplary light-weight CNN 540 receives the input image at its original scale and receives the output of exemplary powerful CNN 530. The outputs of the two exemplary CNNs 530 540 are merged at 560 with the results, such as identification of an object, being provided in results 560. Note again that the powerful CNN 530 is provided with the downscaled image to provide accurate, but costly, analysis and the light-weight CNN 540 is provided with the original scale image to provide an efficient but less accurate analysis.

Figure 6:
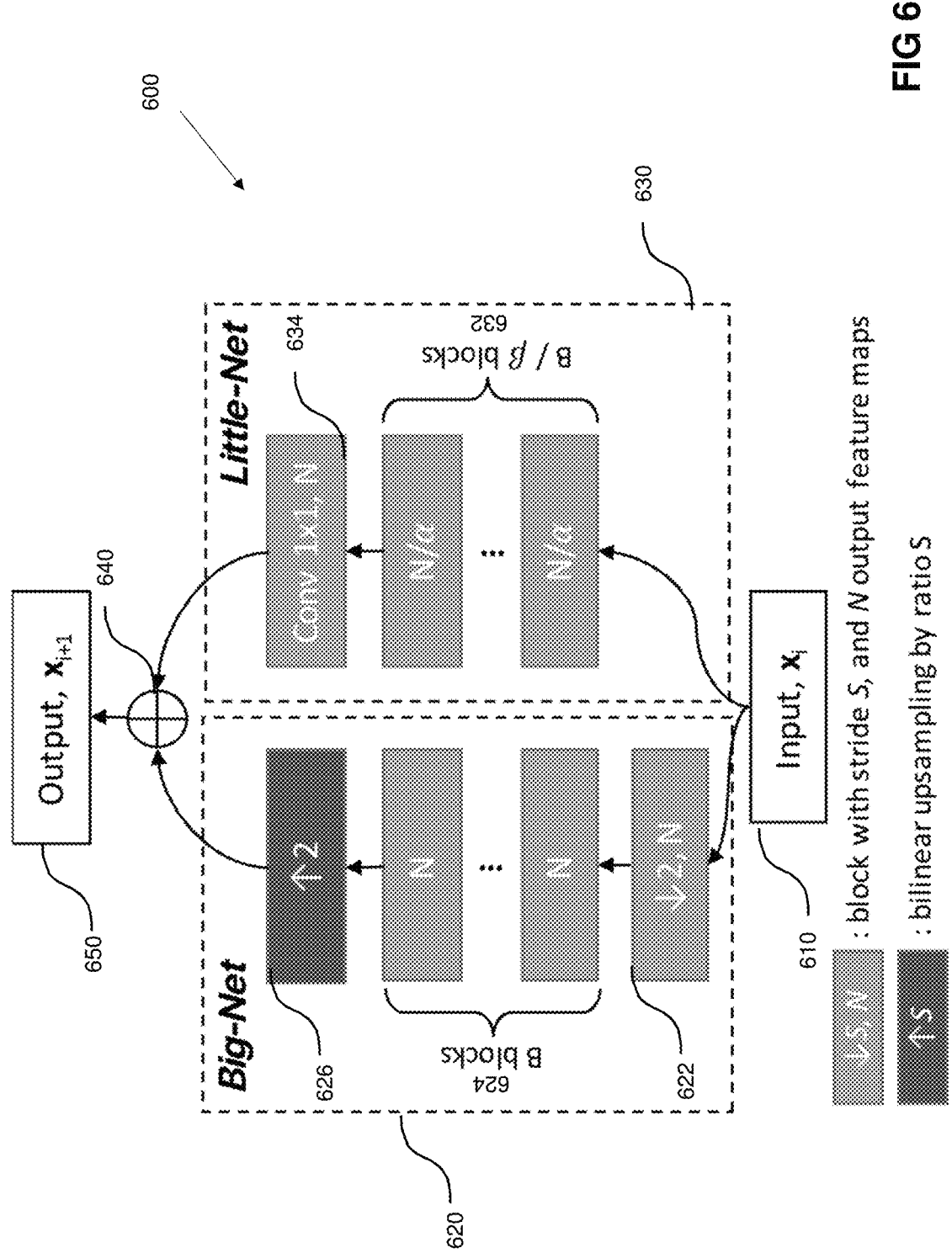
FIG. 6 depicts an exemplary bL-Net 600 for faster recognition and detection according to embodiments of the invention.

FIG. 6 depicts an exemplary bL-Net 600 for faster recognition and detection according to embodiments of the invention. Two parameters specify the complexity of the Little-Net 630, which is the light-weight network that operates on the original scale input. Alpha slims the network by a ratio of alpha; while beta shrinks the number of layers of the network by a ratio of beta. The larger the alpha, the smaller the computation and model size. Note in FIG. 6, unlike the other figures, the length of a block is not proportional to its complexity; they are all drawn the same size regardless of model size or complexity.

The inputs to bL-Net 600 is a signal that can be, for example, an image or an audio input. As stated previously, this holds true for all of the MSCNNs that have been previously described. Input, $x_i$ 610, or the ith input, is received by Big-Net 620 and Little-Net 630. Big-Net 620 is an exemplary powerful CNN. Little-Net 630 is an exemplary light-weight CNN. Turning to Big-Net 620, input 610 is downscaled by a factor of 2 with N number of feature maps at block 622. The output of block 622 is fed through B number of blocks 624 with each block having N feature maps. The designer of the network sets the value of B. B can be for example, 99. At the end of Big-Net 620 the output is upscaled by a factor of 2 to match the original scale of the input.

Turning to Little-Net 630, the input 610 is received by the first of B/beta blocks 632 and then processed by all of the B/beta blocks 632. At the end a 1×1 convolution is performed on the output of the last of the B/beta blocks 632. Note that each of the B/beta blocks has N/alpha number of feature maps. Thus, Little-Net 630, which operates on the full scale input, is less complex than Big-Net 620, which operates on the scaled down input.

Following processing by Big-Net 620 and Little-Net 630 the output is pairwise merged at merge 640 and output at output 650. The output may be an image classification or audio classification, for example.

Figure 7:
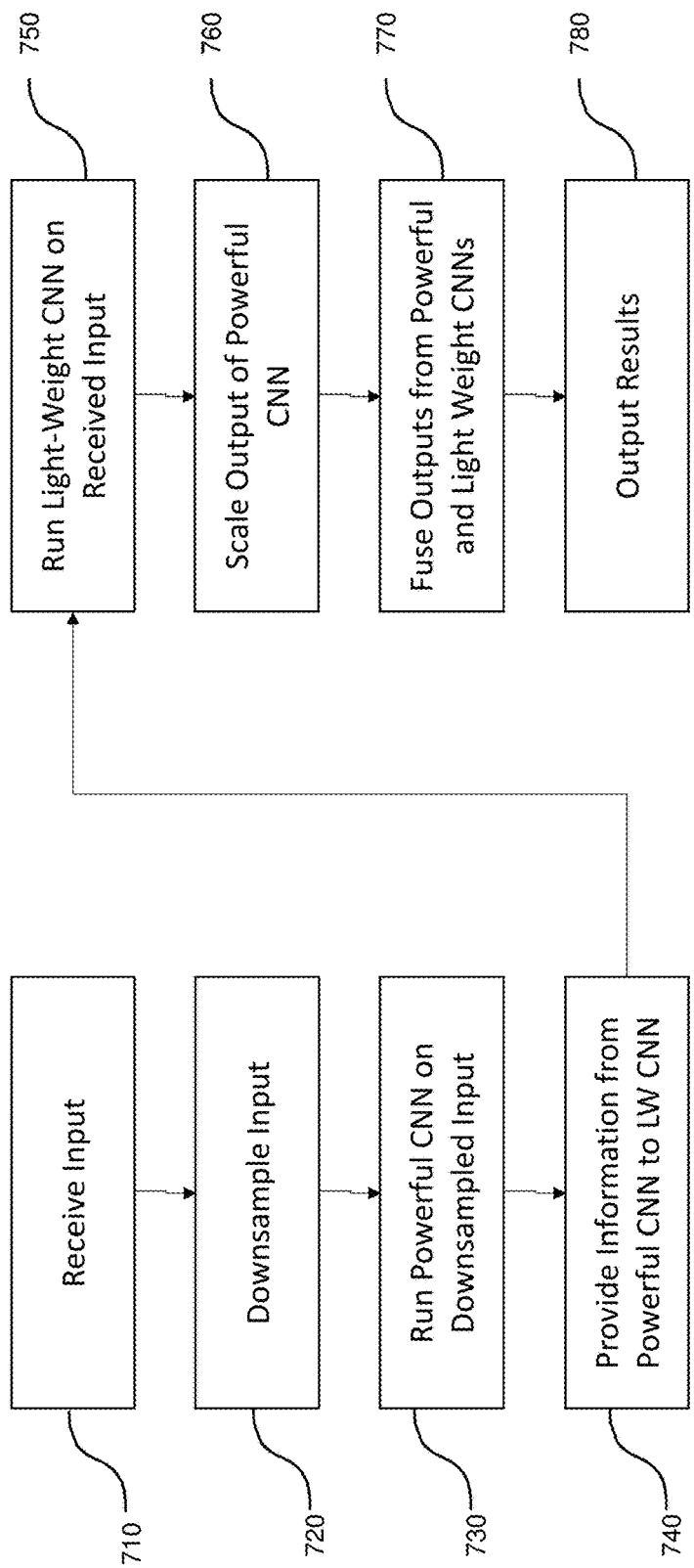
FIG. 7 depicts a flowchart of the operation of an exemplary bL-Net according to embodiments of the invention.

FIG. 7 depicts a flowchart of the operation of an exemplary bL-Net according to embodiments of the invention. An input is received (stage 710). The input may be, for example, an image or an audio input. The input is downsampled by, for example, a factor of two, into a downsampled image (stage 720). The downsampled input is fed into a powerful CNN, for example a ResNet or ResNeXt (stage 730). ResNeT can be, for example, ResNet-50, ResNet-101, or ResNet 152. The ResNeXt can be, for example, ResNeXt-50 or ResNeXt-101. An output of the powerful CNN is output to a light-weight CNN (stage 740), which is also a ResNet or ResNeXt, but simplified. The light-weight CNN has simplified complexity and model size as previously described with respect to FIG. 6. Alpha and beta can range in values, for example, from two to four. The light-weight CNN receives the output of the powerful CNN and the received input and processes them (stage 750).

The output of the powerful CNN is scaled back up to its original size (stage 760). Next, the scaled back up output of the powerful CNN is merged piecewise, for example, with the output of the light-weight CNN (stage 770). The results, for example, an image identification, are then provided (stage 780).

Figure 8:
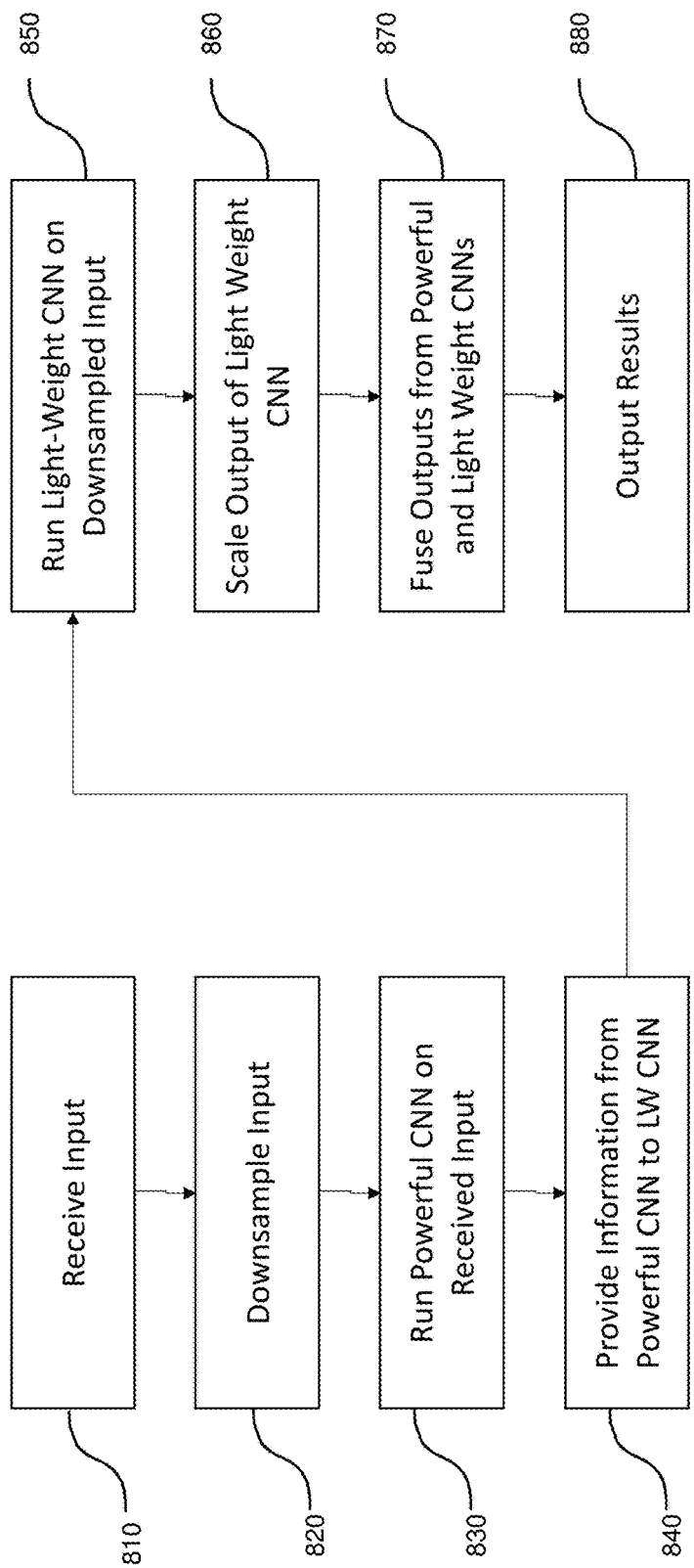
FIG. 8 depicts a flowchart of the operation of an exemplary MSCNN for high performance according to embodiments of the invention.

FIG. 8 depicts a flowchart of the operation of an exemplary MSCNN for high performance according to embodiments of the invention. An input is received (stage 810). The input may be, for example, an image or an audio input. The input is downsampled by, for example, a factor of two, into a downsampled image (stage 820). The received input is fed into a powerful CNN, for example a ResNet or ResNeXt (stage 830). ResNet can be, for example, ResNet-50, ResNet-101, or ResNet 152. The ResNeXt can be, for example, ResNeXt-50 or ResNeXt-101. An output of the powerful CNN is output to a light-weight CNN (stage 840), which is also a ResNet or ResNeXt, but simplified. The light-weight CNN has simplified complexity and model size as previously described with respect to FIG. 6. Alpha and beta can range in values, for example, from two to four. The light-weight CNN receives the output of the powerful CNN and the downsampled input and processes them (stage 850).

The output of the light-weight CNN is scaled back up to its original size (stage 860). Next, the scaled back up output of the light-weight CNN is merged piecewise, for example, with the output of the powerful CNN (stage 870). The results, for example, an image identification, are then provided (stage 880).

FIG. 9 depicts a table of exemplary results comparing operation of a bL-Net to a baseline ResNet according to embodiments of the invention. As can be seen in the table, the baseline ResNet-101 has a 21.95% Top-1 Error, and its operations take $7.80 \times 10^9$ FLOPs. The Big-Little networks, or bL-ResNet-101s, operate significantly faster with a comparable error rate to the baseline. For example, bL-ResNet-101 has an error rate of 22.90%, while operating at a FLOPs of $3.75 \times 10^9$ (2.07× faster operation than the baseline. Similar results are found operating ResNet-152

FIG. 10 depicts two graphs of exemplary results comparing operation of a bL-Net to a baseline ResNet and a baseline ResNeXt according to embodiments of the invention. Graph 910 shows a comparison of a baseline ResNet with two bL-ResNets. Both bL-ResNets operate much faster than the baseline ResNet with about the same error rate. Graph 920 shows a comparison of a baseline ResNeXt and DenseNet with two bL-ResNeXts. Again, both bL-ResNeXts operate faster than the baseline.

Figure 11:
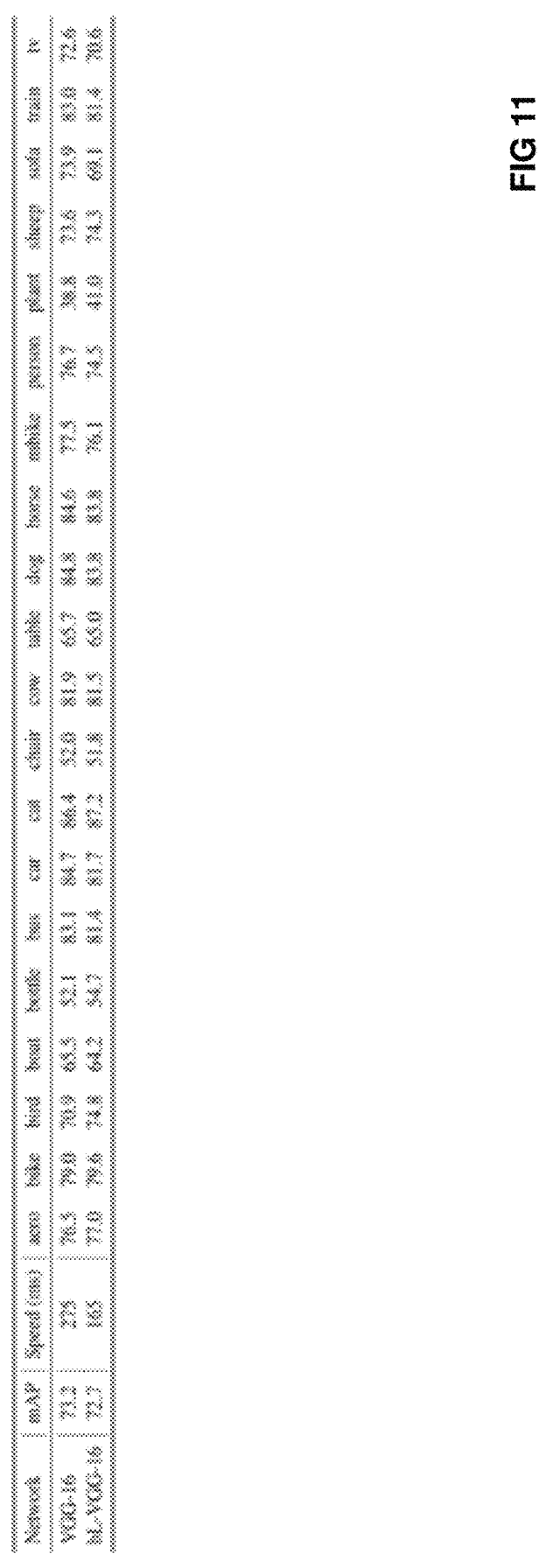

FIG. 11 depicts a table of exemplary results comparing operation of a bL-Net to a baseline VGG-16 network according to embodiments of the invention. This table shows the test result accuracy of localizing and classifying objects and the speed in milliseconds at which the identification takes place. The bL network operates in 165 ms compared to the baseline VGG network that takes 275 ms to operate and identify the objects. The bL network actually outperforms the baseline VGG network, having a mean average precision ("mAP") of 72.7 compared to 73.2

FIG. 12 depicts a table comparing object detection of two bL-Nets compared to a baseline VGG-16 network using the KITTI benchmark according to embodiments of the invention. Both bL nets operate at faster speeds than the baseline VGG network. The faster bL-VGG-16-I operates at 137 ms with comparable accuracy to the baseline. The comparable speed bL-VGG-16-II operates at approximately the same speed as the baseline, but with superior results.

Figure 13:
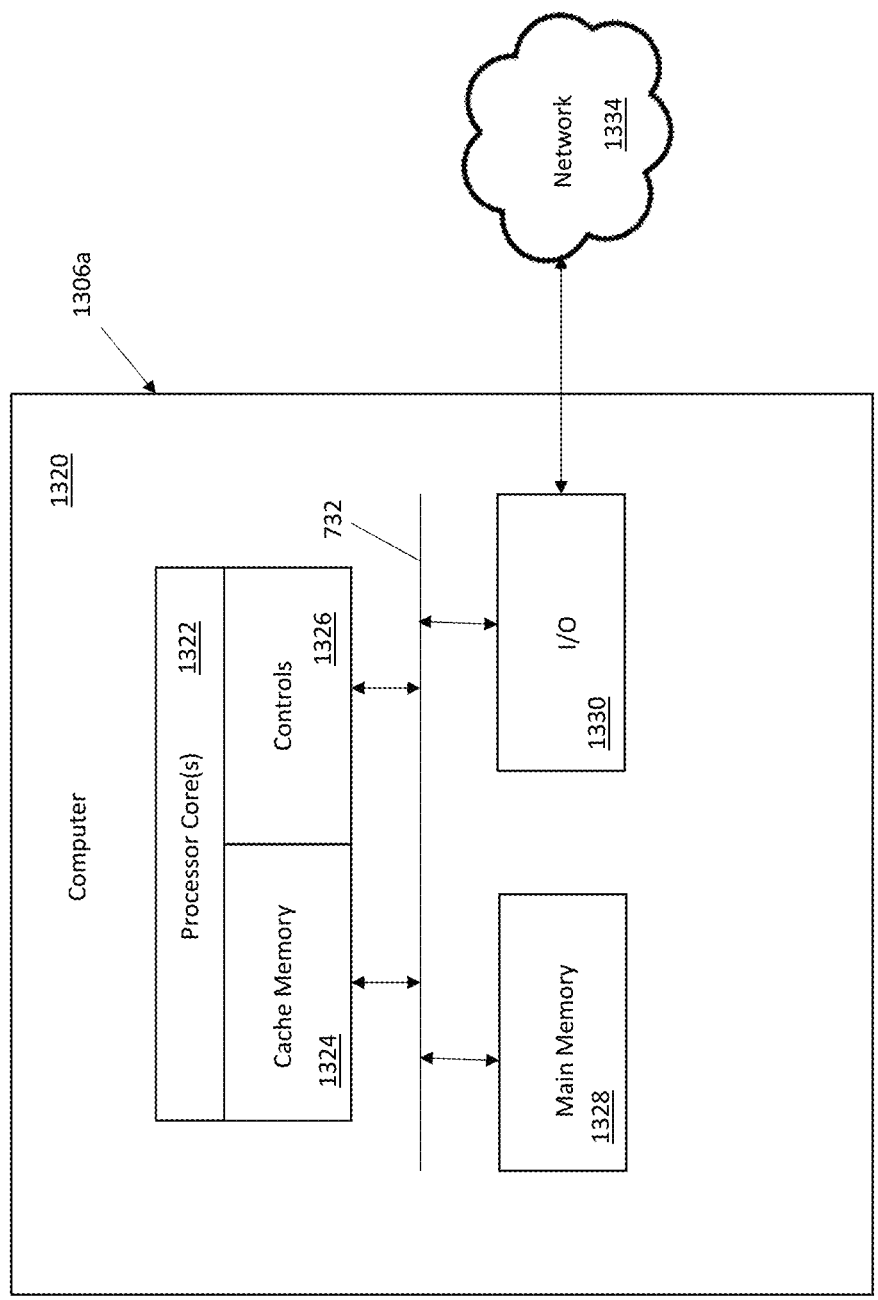
FIG. 13 illustrates a more detailed example of how a multiscale CNN may be implemented as a computer system including an exemplary computing device configured to provide a multiscale CNN in accordance with the present invention.

FIG. 13 illustrates a more detailed example of how MSCNN 300, MSCNN 400, bL-Net 500, or bL-Net 600 may be implemented as a computer system 1306A including an exemplary computing device ("computer") 1320 configured to provide an MSCNN 300, 400, 500, 600 (shown in FIGS. 3, 4, 5, and 6) in accordance with the present invention. In addition to computer 1320, exemplary computer system 1306A includes network 1334, which connects computer 1320 to additional systems (not depicted) and may include one or more wide area networks (WANs) and/or local area networks (LANs) such as the Internet, intranet(s), and/or wireless communication network(s). Computer 1320 and additional systems are in communication via network 1334, e.g., to communicate data between them.

Exemplary computer 1320 includes processor cores 1322, main memory ("memory") 1328, and input/output component(s) 1330, which are in communication via bus 1332. Processor cores 1322 includes cache memory ("cache") 1324 and controls 1326, which include components configured to communicate MSCNN 300, 400, 500, 600 (shown in FIGS. 3, 4, 5, and 6). Cache 1324 may include multiple cache levels (not depicted) that are on or off-chip from processor 1322. Memory 1324 may include various data stored therein, e.g., instructions, software, routines, etc., which, e.g., may be transferred to/from cache 1324 by controls 1326 for execution by processor 1322. Each of the modules previously described with respect to FIGS. 2, 3, 4, 5, and 6 are stored in Memory 1324. Input/output component(s) 1330 may include one or more components that facilitate local and/or remote input/output operations to/from computer 1320, such as a display, keyboard, modem, network adapter, etc. (not depicted).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, an original input;
   downsampling, by the processor, the original input into a downscaled input by a predetermined factor, the downscaled input comprising a lower resolution than the original input;
   inputting the downscaled input comprising the lower resolution to a first convolutional neural network (CNN);
   running, by the processor, the first CNN on the downscaled input and upscaling by the predetermined factor, thereby resulting in a first output;
   inputting the original input comprising a higher resolution than the downscaled input to a second CNN;
   running, by the processor, the second CNN on the original input having the higher resolution in which the original input is not downscaled, thereby resulting in a second output, wherein the first CNN comprises a number of B layers and the second CNN comprises the number of B layers divided by $\beta$, where $\beta$ ranges from 2-4, wherein the first CNN is configured to acquire feature representations and the second CNN is configured for enhancement of the feature representations;
   merging, by the processor, the first output of the first CNN with the second output of the second CNN, wherein the merging is performed as a groupwise merger; and
   providing a result, by the processor, following the merging of the first and second outputs, wherein the first CNN is associated with a first scale and the second CNN is associated with a second scale, wherein, during training, branches of the first CNN and the second CNN are merged such that the first CNN learns from the second scale of the second CNN and the second CNN learns from the first scale of the first CNN, thereby allowing the first CNN and the second CNN to learn differences between the first and second scales.

2. The computer-implemented method of claim 1, wherein the original input comprises image data representing an image.

3. The computer-implemented method of claim 1 further comprising providing the first output of the first CNN as an input to the second CNN.

4. The computer implemented method of claim 1, wherein the result is an identification of an object.

5. The computer implemented method of claim 1, wherein the input comprises audio data presenting an audio input.

6. The computer implemented method of claim 1, wherein the second CNN has a smaller feature map than the first CNN.

7. A system comprising:
   a memory;
   a processor communicatively coupled to the memory, the processor operable to execute instructions stored in the memory, the instructions causing the processor to:
   receive an original input;
   downsample the original input into a downscaled input by a predetermined factor, the downscaled input comprising a lower resolution than the original input;
   input the downscaled input comprising the lower resolution to a first convolutional neural network (CNN);
   run the first CNN on the downscaled input and upscale by the predetermined factor, thereby resulting in a first output;
   input the original input comprising a higher resolution than the downscaled input to a second CNN;
   run the second CNN on the original input having the higher resolution in which the original input is not downscaled, thereby resulting in a second output, wherein the first CNN comprises a number of B layers and the second CNN comprises the number of B layers divided by $\beta$, where $\beta$ ranges from 2-4, wherein the first CNN is configured to acquire feature representations and the second CNN is configured for enhancement of the feature representations;
   merge the first output of the first CNN with the second output of the second CNN, wherein the merging is performed as a groupwise merger; and
   provide a result following the merging of the first and second outputs, wherein the first CNN is associated with a first scale and the second CNN is associated with a second scale, wherein, during training, branches of the first CNN and the second CNN are merged such that the first CNN learns from the second scale of the second CNN and the second CNN learns from the first scale of the first CNN, thereby allowing the first CNN and the second CNN to learn differences between the first and second scales.

8. The system of claim 7, wherein the original input comprises image data representing an image.

9. The system claim 7, wherein the instructions further cause the processor to provide the output of the first CNN as an input to the second CNN.

10. The system of claim 7, wherein the result is an identification of an object.

11. The system of claim 7, wherein the input comprises audio data representing an audio input.

12. The system of claim 7, wherein the second CNN has a smaller feature map than the first CNN.

13. A computer program product for multiscale representation of image data, the computer program product comprising a computer readable storage medium having program instructions embodied therewith, the program instructions executable by a computer, to cause the computer to perform a method comprising:
receiving, by a processor, an original input;
downsampling, by the processor, the original input into a downscaled input by a predetermined factor, the downscaled input comprising a lower resolution than the original input;
inputting the downscaled input comprising the lower resolution to a first convolutional neural network (CNN);
running, by the processor, the first CNN on the downscaled input and upscaling by the predetermined factor, thereby resulting in a first output;
inputting the original input comprising a higher resolution than the downscaled input to a second CNN;
running, by the processor, the second CNN on the original input having the higher resolution in which the original input is not downscaled, thereby resulting in a second output, wherein the first CNN comprises a number of B layers and the second CNN comprises the number of B layers divided by β, where β ranges from 2-4, wherein the first CNN is configured to acquire feature representations and the second CNN is configured for enhancement of the feature representations;
merging, by the processor, the first output of the first CNN with the second output of the second CNN, wherein the merging is performed as a groupwise merger; and
providing a result, by the processor, following the merging of the first and second outputs, wherein the first CNN is associated with a first scale and the second CNN is associated with a second scale, wherein, during training, branches of the first CNN and the second CNN are merged such that the first CNN learns from the second scale of the second CNN and the second CNN learns from the first scale of the first CNN, thereby allowing the first CNN and the second CNN to learn differences between the first and second scales.

14. The computer program product of claim 13, wherein the original input comprises image data representing an image.

15. The computer program product of claim 13, wherein the program instructions further cause the computer to provide the output of the first CNN as an input to the second CNN.

16. The computer program product of claim 13, wherein the result is an identification of an object.

17. The computer program product of claim 13, wherein the second CNN has a smaller feature map than the first CNN.

18. The computer-implemented method of claim 1, wherein the downsampling of the original input into the downscaled input comprises downsampling the original input by a factor of 2.

19. The computer-implemented method of claim 1, wherein a size of each layer of the B layers divided by β in the second CNN is reduced by a ratio of α, where α ranges a value of 2-4.

* * * * *